Inventor
Francis H. Tennis

Inventor
Francis H. Tennis

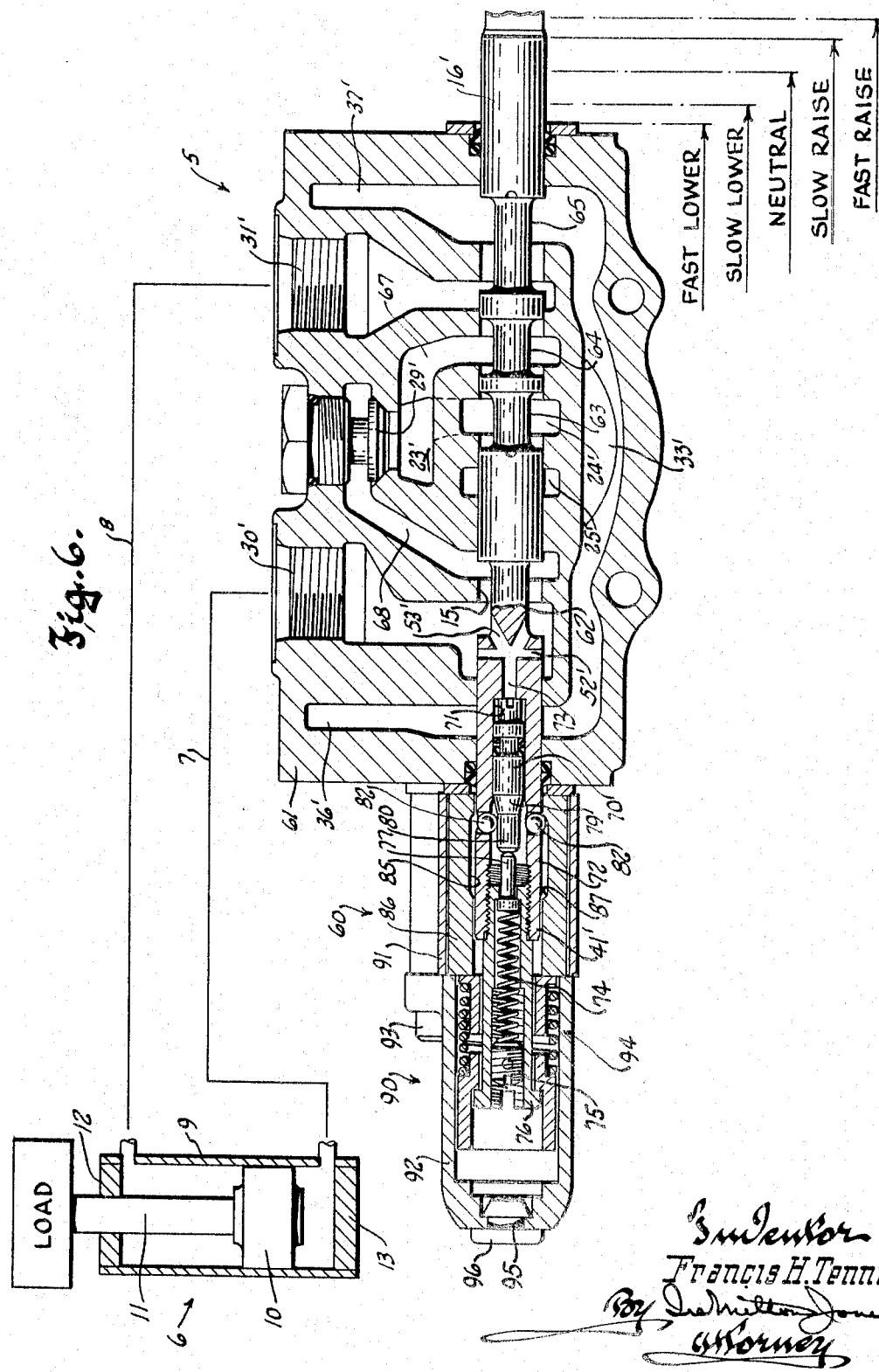

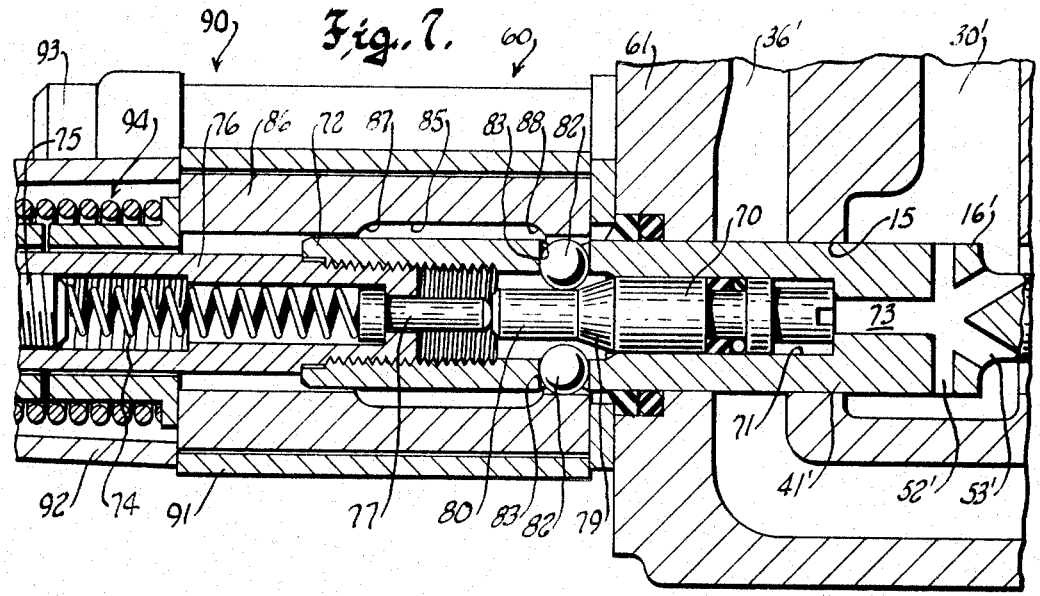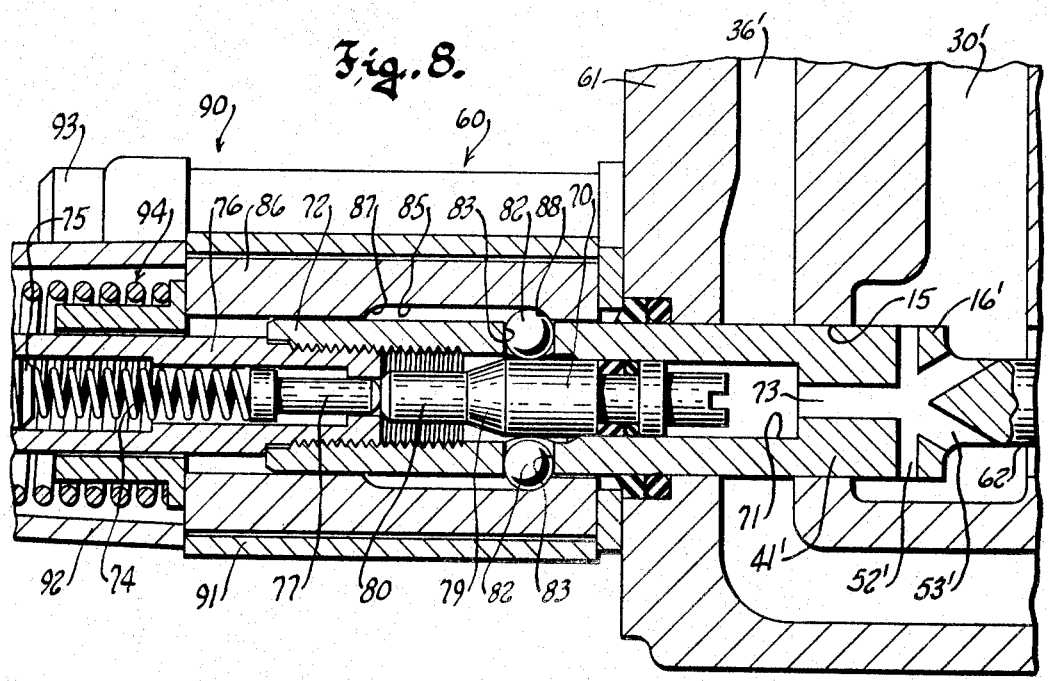

United States Patent Office 3,263,574
Patented August 2, 1966

3,263,574
SPEED AND DIRECTIONAL CONTROL VALVE FOR DOUBLE ACTING LIFT CYLINDER
Francis H. Tennis, Hartland, Wis., assignor to Hydraulic Unit Specialties Company, Pewaukee, Wis., a corporation of Wisconsin
Filed Sept. 21, 1965, Ser. No. 488,989
13 Claims. (Cl. 91—436)

This application is a continuation-in-part of my copending application entitled, Speed and Directional Control Valve for Double Acting Lift Cylinder, Serial No. 230,524, filed October 15, 1962, now abandoned. Like its parent, the invention to which this application is directed also relates to control valves for double acting hydraulic cylinders, and refers more particularly to improvements in control valves for double acting hydraulic lift cylinders that are required to effect both controlled raising and controlled lowering of substantially heavy loads.

A hydraulic cylinder which effects raising and lowering of the fork of a lift truck is an example of a double acting lift cylinder that is subjected to widely varying load forces and for which the control valve of this invention is ideally suited. When pressure fluid is introduced into the head end of such a cylinder, which may be designated its "lifting" end, such fluid forces a slidable piston in the cylinder to move in a direction to raise the fork of the truck, while introduction of hydraulic fluid into the rod or "lowering" end of the cylinder effects motion of the fork in its downward direction. The piston is connected with the fork by means of a piston rod which extends coaxially through and beyond the "lowering" end of the cylinder. Hence the surface area of the piston which is exposed to fluid in the "lowering" or rod end of the cylinder is less than that at the opposite or head side of the piston by an amount equal to the cross section area of the piston rod. However the difference in effective piston areas which is caused by the rod is in no wise adverse to efficient operation of the hydraulic cylinder mechanism, because downward movement of the fork is assisted by gravity acting upon the fork and any load that it may be carrying, and the hydraulic cylinder mechanism must work against gravity only when pressure fluid is being applied to the side of the piston having the larger effective area.

Control of such a hydraulic cylinder or motor is conventionally effected by means of a valve having a manually shiftable valve element or spool end wise slidable in a bore in the valve body. Heretofore such a valve has had either three or four defined positions of its spool, which positions are usually detented. In a neutral or "hold" position of the spool the valve prevented flow of hydraulic fluid both into and out of the cylinder, locking the piston and any load connected when the valve spool was moved to the neutral position. In a "raise" position of the valve spool, in which it was spaced a predetermined distance in one direction from its neutral position, the valve caused hydraulic pressure fluid from a source thereof to be sent to the "lifting" or head end of the cylinder and permitted return fluid from the "lowering" or rod end of the cylinder to flow to a reservoir or the like. In a "lowering" position of the valve spool, spaced a predetermined distance in the opposite direction from its neutral position, the valve sent hydraulic pressure fluid to the "lowering" or rod end of the cylinder while permitting return fluid from the "lifting" or head end to flow to the reservoir. In many prior control valves the spool also had a "float" position in which the opposite sides of the cylinder were connected with one another and with the reservoir through the valve, to permit the piston and the load connected therewith to move more or less freely in response to the force of gravity thereon.

In the case of a fork lift truck having a double acting lift cylinder controlled by a valve of the prior type, upward movement of the fork was relatively slow, since the "raise" position of the valve provided for the conditions that existed when the fork was loaded to its maximum capacity, regardless of the actual load thereon. In many situations, however, it is desirable to provide for relatively fast raising of the fork when there is no load on it, so that it can be rapidly moved to a position in which it can engage a load at a high elevation, thus speeding up the operating cycle of the machine.

With this in mind it is a general object of the present invention to provide a control valve for a double acting hydraulic cylinder of the type having unequal effective areas on the opposite surfaces of its piston, which control valve incorporated means for causing rapid movement of the piston in the direction toward the rod end of its cylinder, with relatively small driving force, when the spool of the control valve is shifted to a predetermined "fast raise" position, such position being in addition to the normal positions of the spool heretofore conventionally provided.

It will be apparent that it is another object of this invention to provide a control valve for the double acting hydraulic cylinders of fork lift trucks, end loaders and similar machines having an element to which lifting and lowering motion must be imparted, which valve tends to bring about a substantial decrease in the time required for an operating cycle of the machine by providing for rapid raising of the vertically movable element when the same is not loaded, to enable it to be very quickly moved up to a position at which it is to engage an elevated load.

Another and more specific object of this invention is to provide a hydraulic control valve of the character described having a body which is generally conventional, in that it can be used to provide the usual three and four position control arrangements, and wherein mere substitution of a special valve spool for one that provides such three or four position operation converts the valve to one having five distinct control positions, in one of which the valve provides for fast raising of a double acting cylinder.

Another object of this invention is to provide a control valve of the character described which provides a defined "slow lower" position. Heretofore in control valves for double acting lift cylinders the defined "lower" position of the valve spool provided for the introduction of pressure fluid into the "lowering" or rod end of the cylinder at the maximum available flow rate and permitted substantially unrestricted flow of return fluid out of the "lifting" or head end of the cylinder. If the motor was operating under any substantial load, the force of gravity tended to effect such rapid movement of the piston in the lowering direction that the pump could not supply pressure fluid to the "lowering" or rod end of the cylinder fast enough to fill the void. For controlled lowering the operator had to hold the valve spool in a metering position intermediate the defined "neutral" and "lower" positions. Since the latter two positions were usually detent defined, the operator had to find the required metering position by feel and to keep his hand on the valve actuator as long as he desired to have controlled or slow lowering continue.

By contrast, it is a further specific object of this invention to provide a control valve for a double acting hydraulic lift cylinder having five defined positions, namely: a neutral or "hold" position, "slow lower," "fast lower," "slow raise" and "fast raise" positions; and which valve, in its defined "slow lower" position provides for throttled or restricted flow of return fluid from the "lifting" or head end of a cylinder connected with it, to insure that the cylinder will afford the desired slow downward movement of its load even though such load may be a substantially heavy one.

The foregoing objects relate to subject matter common to this application and my aforesaid copending application Serial No. 230,524, and the following objects relate to subject matter not disclosed in said copending application.

Another object of this invention resides in the provision of a speed and directional control valve for hydraulic lift cylinders and the like, incorporating stop means for the movable valve element which senses the load on the cylinder and allows the movable control element of the valve to be shifted to its "fast raise" position only when the load on the cylinder is below a predetermined moderate value.

Still another object of this invention resides in the provision of a control valve of the character described wherein the stop means functions to prevent shifting of the movable control element of the valve to both its "fast raise" and "fast lower" positions in the event the load on the cylinder is excessive.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate two complete examples of the physical embodiments of the invention constructed according to the best modes so far devised for the practical application of the principles thereof, and in which:

FIGURE 1a is a sectional view taken through FIGURE 1 on the line 1a—1a;

FIGURE 6 is a view similar to FIGURE 1, illustrating another embodiment of the invention incorporating load sensitive stop means for the valve spool, and showing the valve spool in its slow raise position;

FIGURE 7 is an enlarged view of a portion of the valve seen in FIGURE 6, but showing the valve spool in its fast raise position; and FIGURE 8 is a view similar to FIGURE 7, showing how the stop mechanism functions to prevent movement of the valve spool to both its fast raise and fast lower positions.

Figure 1:
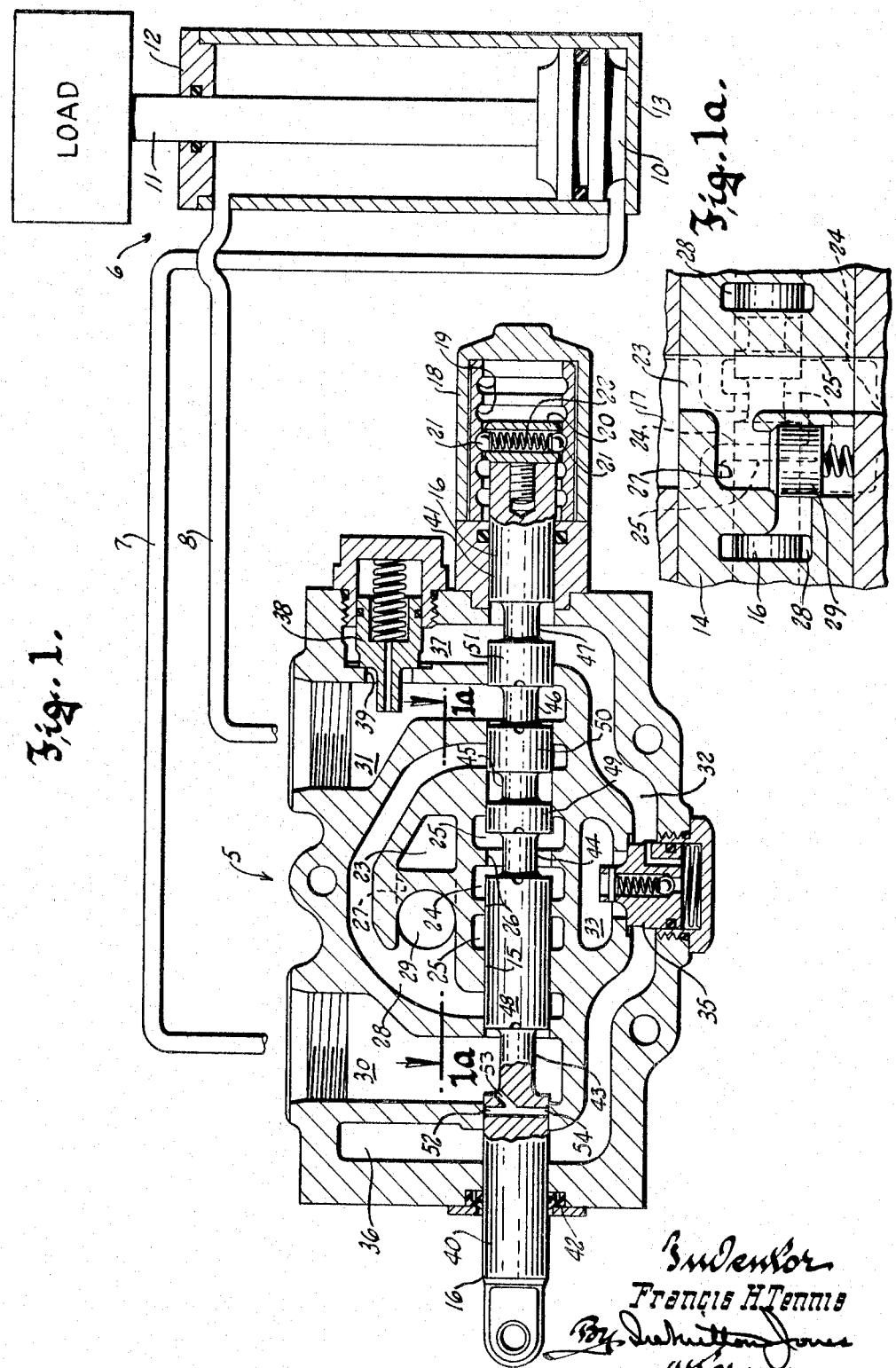
FIGURE 1 is a longitudinal sectional view of a hydraulic control valve embodying the principles of this invention, with its spool shown in its neutral or "hold" position, and the valve being shown connected to a double acting lift cylinder which is illustrated more or less diagrammatically.

Referring now more particularly to the accompanying drawings, the numeral 5 designates generally a hydraulic control valve embodying the principles of this invention and which is connected with a double acting hydraulic lift cylinder mechanism 6, for control of the same, by means of lines 7 and 8. The cylinder mechanism or hydraulic motor 6 comprises a cylinder 9 in which a piston 10 is slidable in opposite directions. A rod 11 that projects coaxially from the piston through one end of the cylinder connects the piston with a load to be actuated, such as the fork of a fork lift truck, the boom of an end loader or the like.

The end 12 of the cylinder through which the rod 11 projects, and with which the line 8 communicates, may be designated its "lowering" or rod end, since the introduction of pressure fluid thereinto imposes a force upon the piston in the direction to move it and its connected load downward. Similarly the opposite end 13 of the cylinder, which is communicated with the line 7, may be designated its "lifting" or head end because pressure fluid introduced thereinto exerts force upon the piston in the direction to drive it and its connected load upward. It will be noted that the effective face area of the piston which is exposed to fluid in the "lowering" or rod end 12 of the cylinder is less than that exposed to fluid in the "lifting" or head end 13, due to the presence of the rod 11 which has a uniform diameter along its entire length; and hence fluid at a given pressure introduced into the "lifting" or head end 13 of the cylinder will exert a greater force upon the piston than fluid at the same pressure introduced into its rod end. In other words, at any given fluid pressure in the system the piston exerts greater force in its "lifting" than in its "lowering" direction of motion.

The valve 5 by which the operation of the hydraulic motor 6 is controlled is generally like that of my copending application which issued as patent No. 3,151,630 on October 6, 1964. It is here shown as having a body 14 which comprises one of the elements of a sectional or "stacked" valve assembly that may include one or more additional body elements of the same kind (not shown), each connectable with another hydraulic motor, and complementary inlet and outlet sections (not shown) which are respectively connectable with a source of hydraulic pressure fluid such as a pump and with a fluid reservoir or the like. It will be apparent, however, that the invention is equally applicable to hydraulic control valves of the integral or monoblock type.

Endwise shiftable in a bore 15 in the valve body 14 is a valve element or spool 16 which is manually movable to a number of different positions, at each of which the spool effects a different mode of operation of the hydraulic motor 6 connected with the valve body. In the present instance the several positions of the spool are detent defined by means of a detent mechanism which is illustrated as comprising a tubular housing member 18 fixed on the valve body coaxially with the spool bore and having a series of axially spaced apart inwardly opening grooves 19 therein, a detent carrier 20 in the housing member 18, connected to the spool to move therewith, detent balls 21 carried by the detent carrier for axial motion therewith and for radial motion relative thereto, and a detent spring 22 which is also carried by the detent carrier. The detent carrier 20 comprises a short axially outwardly projecting extension on the spool having a transverse bore therein in which the detent balls 21 and detent spring 22 are received, with the detent spring confined between the balls to bias them radially outwardly in opposite directions.

As the spool is shifted endwise in its bore the detent carrier brings the balls into register with each in turn of the grooves 19 in the tubular member 18, and the spring 22 urges the balls into yielding detent defining engagement with the grooves. The grooves are of course so spaced along the length of the tubular member 18 as to cooperate with the balls in defining a neutral position and several operating positions of the spool, there being in this case four operating positions of the spool (described hereinafter) which may be designated "fast lower," "slow lower," "fast raise" and "slow raise."

The control valve is illustrated as being of the open center type, characterized by an open center or through passage that intersects the bore 15 and having upstream and downstream sections 24 and 25 respectively which are communicable with one another through short medial sections 26 of the spool bore to which both open. The upstream open center passage section 24 of course, opens through one face of the body 14 and is communicable with the supply header 17 of an inlet manifold section either directly, as seen in FIGURE 1a, or through registering open center passages in one or more body elements interposed between the manifold section and the body 14. As is customary, the header 17 of the manifold section is connectable with a pump or other source of pressure fluid, to in turn communicate the open center passage with the source. The downstream section 25 opens through the opposite face of the body 14 so as to be communicable with the return header of an outlet manifold, not shown, either directly or through registering open center passages in one or more body elements interposed between the outlet manifold and the body 14. As here shown, the downstream section 25 opens to the upstream section 24 of an adjacent body element, for communication with a tank or reservoir through the return header of the outlet manifold. The downstream open center passage section is substantially Y-shaped, so that it intersects the spool bore at zones spaced to opposite sides of its intersection with the upstream open center passage section. In the neutral or "hold" position of the spool, illustrated in FIGURE 1, fluid from the pump can flow unrestrictedly through the valve body to the reservoir by way of the upstream section 24, one or the other of the pair of short medial portions 26 of the spool bore, and one branch of the downstream section 25 of the open center passage.

Also formed in the valve body are a U-shaped bridge passage 28, a pair of service passages 30 and 31 which are respectively connectable with the lines 7 and 8, and return fluid passage means 32 communicable with an outlet passage 33 that leads to the return header of an outlet manifold, not shown, and by which return or exhaust fluid is ultimately conducted to a reservoir or tank connected with the valve.

The U-shaped bridge passage 28 has its bight portion communicated with a feeder passage 23 through a feeder branch 27 containing a check valve 29, and the feeder passage also connects with the inlet of the valve as is customary in parallel valves of the type here illustrated. The legs of the bridge passage intersect the spool bore at zones spaced lengthwise of the spool bore to opposite sides of its medial portions 26. Hence when communication between the upstream and downstream sections of the open center passage, through the medial portions 26 of the spool bore, is blocked in consequence of shifting of the valve spool out of its neutral position, pressure fluid is diverted into the feeder passage 23, from whence it flows through feeder branch 27 and check valve 29 to the bridge passage 28. It should be understood, of course, that the feeder passage 23 communicates with the inlet header 17, as shown in FIGURE 1a, and that it extends through all of the body elements containing valve members such as the spool 16.

The two service passages 30 and 31 intersect the spool bore at zones spaced axially outwardly along said bore from its zones of intersection with the legs of the bridge passage 28, and thus each service passage is communicable through a short section of the spool bore with its adjacent leg of the bridge passage. The exhaust passage means 32 comprises a substantially U-shaped passage, the legs 36 and 37 of which intersect the spool bore near the opposite ends thereof and the bight portion of which communicates with the outlet passage 33 through a flow restricting check valve 35. Hence each of the service passages 30 and 31 is also communicable through another short section of the spool bore with its adjacent leg of the exhaust passage means and with the return header of an outlet manifold through the outlet passage 33.

The end portions 40 and 41 of the spool 16 are of a diameter to have a snugly sliding fit in the spool bore, and, as is conventional, cooperate with O-ring seals 42 or the like, received in the body 14 near the ends of the spool bore, to prevent leakage of hydraulic fluid out of the body. At spaced intervals along its length the spool has five reduced diameter portions or relatively wide grooves 43, 44, 45, 46 and 47 which define four lands 48, 49, 50 and 51 intermediate the end portions of the spool.

The land 48 on the spool is a substantially long one. in the neutral (FIGURE 1) position of the spool, the lands 48 blocks communication between the upstream open center passage section 24 and the left hand downstream section 25, and the spool also blocks communication between the service passage 30, the left hand leg of bridge passage 28 and the leg 36 of the exhaust passage means 32. However in the neutral position of the spool the groove 44 therein provides for communication between the upstream open center passage section 24 and the right hand branch of the downstream open center passage section 25. In that position of the spool, too, axially short lands 49 and 50 thereon block communication between the open center passage and the right hand leg of the bridge passage; land 50 also blocks communication between the bridge passage and service passage 31; and another axially short land 51 blocks communication between service passage 31 and the right hand leg 37 of the return fluid passage 32.

Figure 2:
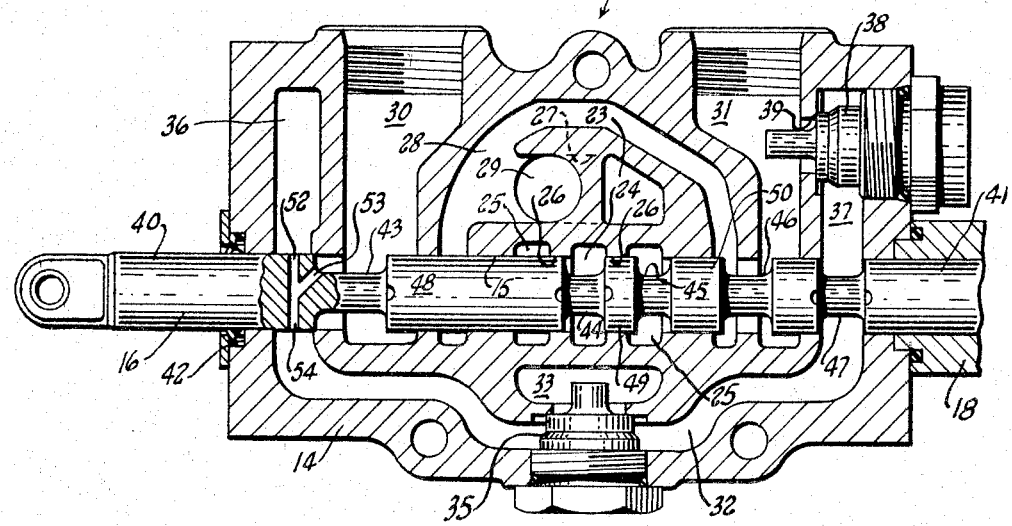
FIGURE 2 is a sectional view similar to FIGURE 1 but showing the valve with its spool in its "slow lower" position.

When the spool 16 is shifted a predetermined distance in one direction from its neutral position (to the left as illustrated in the drawings), it is carried to a "slow lower" position shown in FIGURE 2, in which it provides for communication of the bridge passage 28 with service passage 31 and for restricted communication of service passage 30 with the left hand leg 36 of the exhaust passage 32, at the same time blocking communication between the upstream and downstream sections 24 and 25 of the open center passage. Specifically, in the "slow lower" position of the spool the long land 48 continues to block communication between the upstream open center passage section 24 and the left hand branch of the downstream section 25, and also between the open center passage, the bridge passage and service passage 30. The short land 49 now blocks communication between the upstream open center passage section and the right hand branch of the downstream section, while its adjacent short land 50 blocks communication through the spool bore between the open center and bridge passages. The groove 46 meanwhile provides for communication through the spool bore between the bridge passage and service passage 31 while the short land 51 blocks communication between said service passage and the right leg 37 of the return fluid passage.

Hence the spool, in its "slow lower" position, diverts pressure fluid through the feeder passage 23 to the bridge passage, and thence, by way of service passage 31, to the "lowering" or rod end 12 of the cylinder, while directing return fluid from the "lifting" or head end 13 of the cylinder to a reservoir or the like by way of service passage 30, the exhaust passage means 32 and the outlet passage 33.

Communication between the service passage 30 and the return fluid passage means 32 takes place through a restricting passage 52 that is formed in the spool itself and which opens at one end 53 to the groove 43 and opens at its other end 54 through the large diameter left hand end portion 40 of the spool. The restricted flow of return fluid which this passage permits limits the rate at which the piston can move downwardly and thus provides for controlled lowering of the load connected therewith. However the restriction thus imposed upon return fluid flow does not interfere with the application of downward or lowering force to the piston of the hydraulic motor, unlike the condition that obtained when the spool of a prior control valve was placed in a metering position. It will be apparent, therefore, that the provision of the restricting passage 52 is a feature of the valve of the present invention that adapts it especially well for installation in bulldozers, end loaders and the like wherein a substantial downward force must sometimes be exerted upon a work performing element driven by a double acting cylinder controlled by the valve.

The restricting passage 52 is so arranged that when the spool is in its neutral (FIGURE 1) position the axially inner end 53 of the restricting passage is in communication with the service passage 30 but its other end 54 is blocked by the wall portion of the spool bore that extends between the zones at which the spool bore is intersected by the service passage 30 and the left hand leg 36 of the return fluid passage 32. However movement of the spool to its "slow lower" position carries it a sufficient distance to the left to bring the axially outer end 54 of flow restricting passage 52 into communication with the left leg 36 of the return fluid passage while its axially inner end 53 remains in communication with the service passage 30.

Preferably communication between the return fluid passage 32 and the outlet passage 33 takes place through a flow restrictor which could comprise a suitable orifice but which is in this case illustrated as a flow restricting type of check valve 35. There is also provided a reverse acting check valve 38 which controls communication, through a short passage 39, between the service passage 31 and its adjacent leg 37 of the return fluid passage 32. In the event the passage 52 through the valve spool does not provide sufficient restriction to flow of return fluid from the "lifting" end 13 of the cylinder, and a void tends to be drawn in the "lowering" end 12 thereof, the check valve mechanisms 35 and 38 cooperate to permit return fluid from the return fluid passage 32 to flow to service passage 31 and cooperate with pump fluid in preventing cavitation. Specifically, valve mechanism 38 opens when pressure of fluid in the return passage means 32 exceeds that of fluid in service passage 31, and valve mechanism 35 or its equivalent flow restrictor serves to maintain some pressure upon fluid in the return fluid passage 32 to insure prompt opening of valve mechanism 38. This arrangement is generally similar to that disclosed and claimed in the copending application of Francis H. Tennis, which issued as Patent No. 3,134,402 on May 26, 1964, to which reference may be made for further details.

Figure 3:
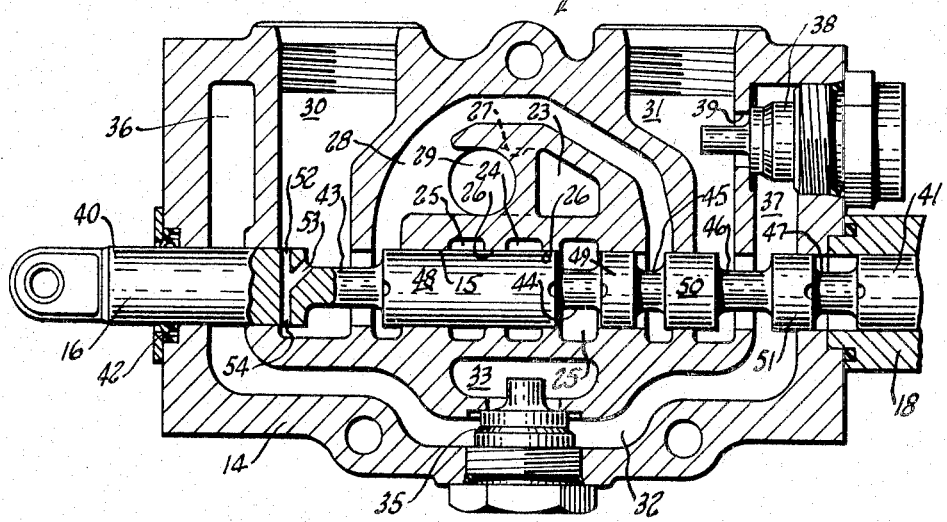
FIGURE 3 is a view similar to FIGURE 2 but showing the spool in its "slow raise" position.

When the spool 16 is shifted a predetermined distance to the right from its neutral position it is brought to a "slow raise" position shown in FIGURE 3, in which it effects lifting of a load connected with the hydraulic motor at a normal rate and with normal force. In the "slow raise" position the elongated land 48 on the spool cooperates with the short land 49 to block communication between the two sections of the open center passage, and between the open center passage and the bridge passage 28, but the groove 43 in the spool clears the portion of the spool bore between the bridge passage and service passage 30 to permit communication between them. At the same time the large diameter left hand end portion 40 of the spool blocks communication between service passage 30 and the left hand leg 36 of the return fluid passage. No flow can take place through the flow restricting passage 52 because it is now wholly disposed within the zone of communication of the service passage 30 with the spool bore.

Thus with the spool in its "slow raise" position pressure fluid is diverted through the feeder passage 23 to the bridge passage 28 and thence to service passage 30, which is communicated with the "lifting" or head end 13 of the cylinder. At the same time the groove 46 in the spool permits return fluid from the rod end 12 of the cylinder, entering service passage 31 by way of line 8, to flow into the right hand leg 37 of the return fluid passage, while the short land 50 blocks communication between the bridge passage and service passage 31.

Figure 4:
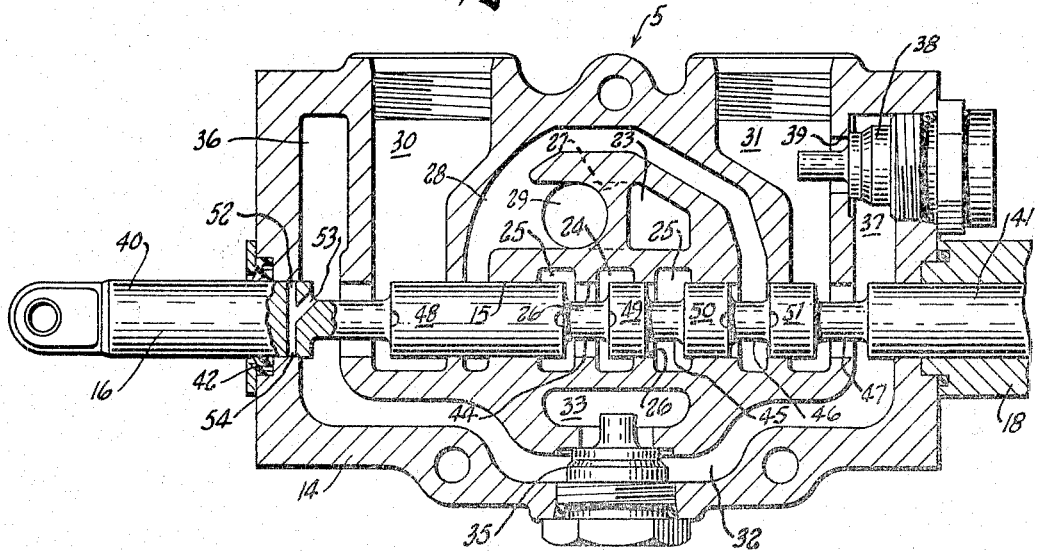
FIGURE 4 is a view similar to FIGURE 2 but with the valve spool shown in its "fast lower" position.

When the valve spool is shifted a predetermined farther distance to the left from its "slow lower" position, to a "fast lower" or "float" position illustrated in FIGURE 4, it effects connection through the valve body of the opposite ends 12 and 13 of the cylinder with one another, so that the piston of the hydraulic motor can move in its lowering direction in response to the force of gravity upon the load thereon. When the spool is in this position its groove 44 communicates the upstream open center passage section 24 with the left hand branch of the downstream open center passage section 25, while lands 48 and 50 respectively block communication through the spool bore between the open center passage and the two legs of the bridge passage 28. The long land 48 also blocks communication between the bridge passage and service passage 30, while the short land 51 blocks communication between the bridge passage and service passage 31. The grooves 43 and 47 respectively permit communication between each of the service passages 30 and 31 and the return fluid passage means, so that the latter provides the connection between the opposite ends of the cylinder when the spool is in its "fast lower" position. It will be observed that in this position of the spool the flow restricting valve mechanism 35, or equivalent restrictor, also prevents cavitation by insuring that an ample supply of return fluid will be present in the return fluid passage 32, available to service passage 31 and the rod end 12 of the cylinder communicated therewith.

Figure 5:
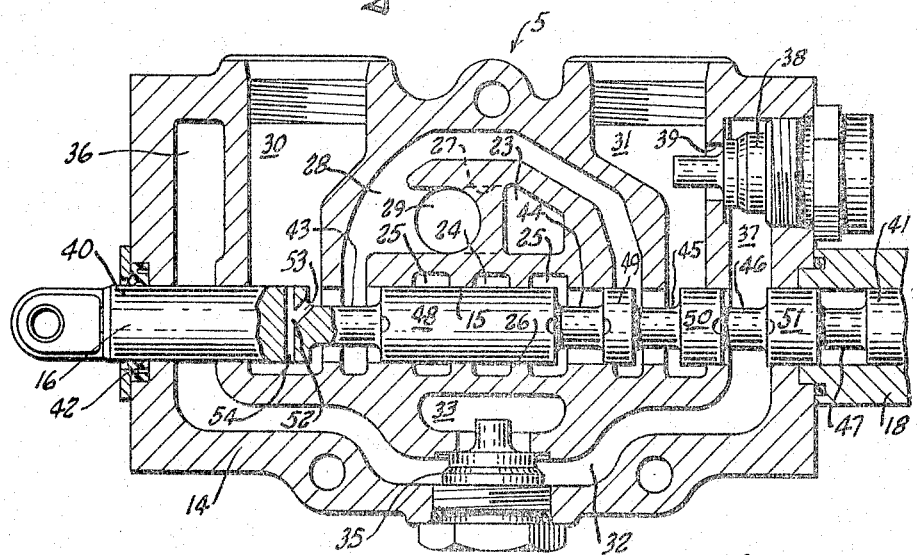
FIGURE 5 is another view similar to FIGURE 2 but showing the spool in its "fast raise" position.

The valve spool is brought to its "fast raise" position (shown in FIGURE 5) by shifting it a predetermined farther distance to the right from its "slow raise" position. In that position of the spool the long land 48 blocks communication between the upstream and downstream open center passage sections, thus causing pressure fluid to be diverted through the feeder passage 23 to the bridge passage 28, while the bridge passage is communicated through the spool bore with both service passages 30 and 31, such communication being provided for by the grooves 43 and 45 in the spool. At the same time, the end portion 40 of the spool blocks communication between service passage 30 and the left leg 36 of the return fluid passage, and the short land 50 blocks communication between service passage 31 and the right leg 37 of the return fluid passage.

Under these conditions the pump is communicated with both ends 12 and 13 of the cylinder by way of service passages 30 and 31 and lines 7 and 8. But because fluid in the "lifting" end 13 of the cylinder can exert the greater force on the piston, due to the difference in the effective areas of the opposite faces of the piston caused by the presence of the rod 11, the piston moves in its load raising direction, forcing fluid out of the "lowering" or rod end 12 of the cylinder. The only route that such return fluid can follow is back through the bridge passage 28 in the valve body and thence into the "lifting" or head end 13 of the cylinder by way of service passage 30 and line 7.

The force that the piston is capable of exerting is equal to the difference between the forces acting upon its opposite faces, or in other words is equal to the system pressure multiplied by the cross section area of the rod 11, and is thus relatively small. However the movement of the piston is quite rapid. The rate of fluid flow into the "lifting" or head end of the cylinder is the total of the flow rate produced by the pump plus the rate at which fluid is displaced from the "lowering" or rod end of the cylinder, and is therefore such that the entire travel of the piston in the lifting direction takes place in the time required for the pump to displace a volume of fluid equal to the volume displaced by the rod 11 when the piston is at the lowermost point in its travel.

FIGURE 6 illustrates how load sensitive stop mechanism 60 can be employed in a speed and directional control valve of this invention to block movement of the valve element or spool 16' thereof to its "fast raise" as well as to its "fast lower" positions in the event the load on the cylinder controlled by the valve exceeds a predetermined normal or moderate value. As will appear hereinafter, the spool stop mechanism 60 can be used with the same control valve mechanism described previously, although it has been here shown incorporated in the body 61 of a five position control valve more like that disclosed in my copending application Serial No. 467,816, filed June 16, 1965, and entitled, Interlock for Hydraulic Control Valves and the Like.

The valve element or spool 16' of the control valve is similarly adapted to control a double acting lift cylinder having its piston rod projecting from one end of the cylinder for connection with a load, such as the fork of a fork lift truck or the like. The head end of the cylinder is similarly communicable with the service passage 30' of the valve, and the rod end of the cylinder is communicable with other service passage 31' of the valve.

While the valve element or spool 16' here shown has only four axially spaced circumferential grooves 62, 63, 64 and 65 therein, reading from left to right in the drawings, it is nevertheless shiftable from a neutral position to first and second operating positions to the right of neutral to respectively effect slow and faster raising of the load on the cylinder, and to third and fourth operating positions to the left of neutral to respectively effect slow and faster lowering of the load on the cylinder. In its neutral position, the valve element or spool 16' prevents escape of hydraulic fluid from the head end of the cylinder and the short land defined by its grooves 63 and 64 is disposed centrally of the inlet branch 24' of the open center passage to allow inlet fluid to flow freely to the outlet branch 25' of the open center passage for return to the reservoir. Hence, in the neutral position of the spool, the load on the cylinder can be held at any given elevation, and the pump is unloaded through the open center passage.

The valve element or spool 16' is shown in its "slow raise" position in FIGURE 6, at which it has been shifted a first distance to the right of neutral. In this position, the lands on the spool are so disposed with respect to the passages in the valve body as to block communication between the inlet branch 24' and the single outlet branch 25' of the open center passage, and to thereby effect diversion of pump fluid flowing into the valve inlet to a feeder passage 23' that communicates with the inlet branch 24' of the open center passage in a well known manner. Pressure fluid thus directed into the feeder passage flows directly to a first branch 67 of a generally U-shaped bridge passage, and past a check valve 29' to the second branch 68 of the bridge passage from whence it flows to the head end of the cylinder via the spool groove 62 and service passage 30'. Fluid exhausting from the rod end of the cylinder is returned to the service passage 31' of the valve, from whence it flows to an outlet passage 33' via the spool groove 65 and the right hand branch 37' of the exhaust passage in the valve body.

When the valve element or spool 16' is shifted to a "slow lower" position located a first distance to the left of neutral, the lands on the spool again block fluid flow between the inlet and outlet branches 24'-25' of the open center passage and divert pump fluid to the feeder passage 23', for flow through the branch 67 of the bridge passage and groove 65 in the spool to the service passage 31' which connects with the rod end of the cylinder. As the load descends, fluid expelled from the head end of the cylinder is returned to the service passage 30' for flow to the left hand branch 36' of the exhaust passage through the restricting passage 52' in the spool. The restricting passage 52', as before, is operative in only the slow lower position of the valve spool, and it causes the load on the cylinder to descend at a controlled and safe slow rate.

If the spool is shifted a greater distance to the left of neutral to a "fast lower" position, the open center passage 24'-25' remains blocked, the service passage 31' remains in communication with the branch 67 of the bridge passage so that pressure fluid continues to flow to the rod end of the cylinder, but return fluid in service passage 30' can now flow freely to the exhaust branch 36' in bypass relation to the restricting passage 52' in the spool, since the spool groove 62 provides full communication between the service passage 30' and the exhaust branch 36' in this position of the spool. Consequently, the load on the cylinder will descend at a rapid rate, unrestricted by the passage 52' in the spool.

When the valve element or spool 16' is shifted to its remaining operating position, to the right of that seen in FIGURE 6, it effects fast raising of the load on the hydraulic cylinder as a result of a regenerative flow circuit which is at that time established through the valve passages. In this position of the valve spool, pressure fluid entering the valve body is again constrained to flow to the feeder passage 23', which now has its branches 67 and 68 in communication with the service passages 31' and 30', respectively, through the spool grooves 64 and 62, respectively. The opposite ends of the cylinder are thus connected to one another and with the pressure fluid source, and such fluid acts upon a greater area of the piston in the head end of the cylinder to cause the load to be raised thereby. The fluid exhausting from the rod end of the cylinder is returned to service passage 31' for flow through the adjacent branch 67 of the bridge passage and the then open check valve 29' to the branch 68 of the bridge, where it joins with pressure fluid from the source. Hence the flow of pump fluid to the head end of the cylinder is augmented by the flow of exhaust fluid returning to the service passage 31', to cause rapid elevation of the load on the cylinder.

According to this invention, the stop mechanism 60 functions to prevent movement of the valve element or spool 16' to both its fast lower position and its fast raise position in the event the pressure of fluid in the service passage 30' rises to or exceeds a predetermined value. The pressure of fluid in service passage 30' always bears a direct relationship to the load on the cylinder and is proportional to such load.

Thus, when the cylinder has its work performing element connected with the fork of a fork lift truck to effect raising and lowering thereof at the dictation of the control valve, it will frequently be dangerous to lower the load at a rate any faster than is permitted by the restricting passage 52' in the valve spool. If the fork is lightly or moderately loaded, it is desirable and advantageous for the operator to shift the valve spool to its "fast lower" position to save time in lowering the load represented by the fork and whatever objects are carried thereby.

However, it is unsafe to effect fast lowering of the fork if it is heavily or excessively loaded, for at such times the lift truck can be upset by the high inertia forces that occur substantially instantaneously when the operator shifts the valve spool back to neutral to stop the descent of the fork at the desired level. Possible serious injury to the operator and damage to costly loads can result if the lift truck is upset under such conditions of operation.

It is also objectionable, at least as to the waste of power which results, for the operator to shift the valve spool to its fast raise position if the load on the fork is excessive. At such times, the pressure in the system substantially instantaneously builds up to the value at which it causes unseating of the relief valve customarily employed with control valves of the type herein concerned. When this occurs, the check valve 29' prevents the loaded fork from descending, and the output of the pump is channeled to the reservoir through the relief valve, thus uselessly wasting the power required to keep the pump in operation against the relatively strong spring in the relief valve. In addition, inexperienced operators can be misled into the belief that the hydraulic system is faulty because of the raucous noise that results whenever the relief valve opens to bypass the output of the pump to the reservoir.

The stop mechanism 60 of this invention comprises a fluid pressure responsive plunger 70 that is movable axially back and forth in a pressure chamber 71 formed in the interior of a tubular extension 72 on the end portion 41' of the valve spool axially outwardly of the restricting passage 52' therein. Pressure fluid can be supplied to the chamber 71 from the adjacent cylinder head connected service passage 30' through an axial passage 73 in the valve spool, connecting with the restricting passage 52'.

The plunger is movable axially away from the bottom of its chamber 71 out of its normally inoperative position seen in FIGURE 6, to an operative position such as seen in FIGURE 8. A return spring 74 furnishes yielding bias to normally hold the plunger in its inoperative position with a force that can be set by an adjusting screw 75 to a value substantially corresponding to a normal or moderate load pressure in the head end of the cylinder 9, and which biasing force is overcome by load pressurized fluid acting upon the plunger whenever the load on the cylinder is excessive. The spring 74 is housed within a tubular fitting 76 that has a reduced end portion threaded into the open outer end of the extension 72 on the valve spool, and it exerts biasing force on the plunger 70 through a pin 77 which has a reduced end portion that projects through a guide hole in the inner end of the fitting and endwise abuts the outer end of the plunger.

The plunger 70 has an axially outwardly convergent cam surface 79 thereon which terminates in a reduced stem 80 on the plunger.

The reduced stem 80 normally extends centrally through a cluster of balls 82 which are received in radial holes 83 in the wall of the tubular spool extension 72 so as to be movable radially inwardly and outwardly relative to the extension while being constrained to move bodily therewith during endwise shifting of the valve spool. The plunger stem 80 thus prevents inward displacement of the balls 82 out of their respective holes in the wall of the extension, and it has a diameter to allow inward retraction of the balls to inoperative positions at which they are substantially wholly within the confines of the extension 72.

The balls 82 are propelled radially outwardly of their holes by the cam surface 79 on the plunger when the latter moves axially outwardly to its operative position at which its unreduced body portion is received between the balls. In that position, the plunger holds the balls in operative positions at which they project into a substantially shallow internal recess 85 in the bore of a sleeve 86 surrounding the extension 72. The sleeve can be considered as axially immovable, and it has opposing stop abutments 87 and 88 that define the axial extremities of the recess 85, and which are engageable by the balls 82 when the latter are in their outwardly projected positions within the recess, to prevent the valve spool from being shifted beyond its slow raise and slow lower positions, respectively, and to thus preclude shifting of the spool to its fast raise and fast lower positions.

When the balls are in their retracted positions, however, they can pass freely into the bore of the sleeve, past the abutments 87 and 88 to enable the spool to be shifted to its fast raise and fast lower positions.

When the valve spool is in its neutral position, the balls 82 are located substantially medially of the stop abutments 87 and 88, and the plunger 70 will remain in its inoperative position as long as the load on the cylinder does not exceed a predetermined moderate or safe value. The valve spool can be shifted to all four of its operating positions when these conditions obtain.

The plunger 70 in effect senses the load on the cylinder whenever the valve spool is in its neutral, slow raise or slow lower positions, and if the load is excessive and above a predetermined safe value, the force of load pressurized fluid in the head connected service passage 30' is imposed upon the plunger to shift it to its operative position, thus projecting the balls 82 radially outwardly and holding them in cooperative relationship with the stop abutments 87 and 88 to thereby render the stop mechanism effective. At such times, therefore, the excessive load on the cylinder can only be raised or lowered at slow speed.

A housing structure, generally designated 90, encloses the stop mechanism 60. It comprises inner and outer tubular housing sections 91 and 92, respectively, concentrically encircling the spool extension 72, the sleeve 86, and the fitting 76, and secured together in coaxial relation and to the valve body by a plurality of screws 93. The inner end of the outer housing section 92 bears against the sleeve 86 so that the latter is confined between the valve body and the outer housing section 92, and held thereby against movement relative to the valve body. The outer housing section 92 may also enclose a conventional centering spring assembly 94 which always tends to return the valve spool to its neutral position. A hole 95 in the outer end of the housing structure provides access to the adjusting screw 75, and is normally closed by a readily removable plug 96 of rubber or the like.

From the foregoing description, together with the accompanying drawings, it will be apparent that this invention provides a control valve for double acting hydraulic lift cylinders featuring a single valve element that is shiftable from a neutral position to four different operating positions to achieve fast raising and lowering of light loads on the cylinder, or slow raising and lowering of heavy loads on the cylinder; and which can be readily equipped with load sensitive stop mechanism for preventing movement of the valve element to its fast raising and lowering positions in the event the load on the cylinder is excessive and above a predetermined safe value.

It will also be apparent that the valve of this invention is connectable with a conventional double acting hydraulic cylinder without requiring any modification thereof; embodies a conventional control valve body of a type normally intended for use with such a cylinder; and is exceptionally well adapted for use in fork lift trucks, bulldozers, front end loaders and other types of equipment.

What is claimed as my invention is:

1. A control valve for a reversible fluid motor, characterized by:
    (A) a body member having
        (1) an inlet to receive pressure fluid from a pump,
        (2) first and second service passages which are adapted to be connected with the opposite sides of a fluid motor,
        (3) and an outlet common to said service passages and through which fluid can be returned to a reservoir;
    (B) a valve member in the body member, movable from a neutral position to at least three working positions;
    (C) cooperating means in the body member and on the valve member effective in a first working position of the valve member to direct fluid from the inlet to the first service passage and to direct exhaust fluid returning to the second service passage to said outlet, said means including flow controlling means in one of said members, which is effective in said first working position of the valve member to restrict flow of exhaust fluid to the outlet, whereby a motor then connected with the service passages will be caused to operate in one direction at a substantially slow rate, said flow controlling means being rendered ineffective in consequence of movement of the valve member to all other positions thereof including its neutral position;
    (D) cooperating means in the body member and on the valve member effective in a second working position of the valve member to direct fluid from the inlet to the second service passage and to direct exhaust fluid returning to the first service passage to said outlet, all in bypass relation to said flow controlling means, so as to cause operation of the motor in the opposite direction at one speed, and effective in a third working position of the valve member to direct said exhaust flow from the first service passage to the second service passage while maintaining flow of fluid from the inlet to the second service passage, all in bypass relation to said flow controlling means, so as to cause operation of the motor in said opposite direction at a higher speed;

(E) and cooperating means in the body member and on the valve member effective in the neutral position of the valve member to close off the service passages from the inlet and to block communication between the inlet and said flow controlling means.

2. In a control valve for a reversible fluid motor:
(A) a body member having
(1) inlet passage means to receive pressure fluid from a pump,
(2) first and second service passages that are connectable with the opposite sides of a fluid motor,
(3) and exhaust passage means having an outlet connectable with a reservoir and common to said service passages;
(B) a valve member movable in the body member from a neutral position to first and second pairs of working positions;
(C) cooperating means on said members effective in the neutral position of the valve member to freely communicate the outlet with the inlet passage means and to close off the latter from both service passages;
(D) cooperating means on said members operable in one of said first pair of working positions to effect flow of pressure fluid from the inlet passage means to the second service passage and to effect return of fluid entering the first service passage to the exhaust passage means so as to cause operation of the motor in one direction at one speed, said cooperating means being operable in the other of said first pair of working positions of the valve member to effect return of fluid entering the first service passage to the second service passage while maintaining flow of pressure fluid to said second service passage from the inlet passage means so as to thereby cause operation of the motor in said one direction at a higher speed;
(E) and cooperating means on said members operable in each of said second pair of working positions of the valve member to effect supply of fluid to said first service passage and to effect return of fluid to the exhaust passage means from said second service passage so as to cause operation of the motor in the opposite direction, said last named means including flow controlling means in one of said members which is effective in one of said second pair of working positions of the valve member to restrict flow of return fluid from said second service passage to the exhaust outlet so as to cause operation of the motor at a substantially slow rate, said flow controlling means being bypassed by fluid flowing in the valve passages in all other positions of the valve member.

3. The control valve of claim 2, further characterized by:
(A) cooperating stop elements carried by the body and valve members, one of which is movable toward and from an operative position at which the stop elements are effective to prevent movement of the valve member to said other of said first pair of working positions thereof;

(B) and control means carried by one of said members, for moving said movable stop element to its operative position, comprising a pressure responsive control element which must be moved from a normally inoperative position to an operative position in order to render the stop elements effective, and which control element is sensitive to fluid pressure in said second service passage to be moved thereby to its operative position whenever said fluid pressure exceeds a predetermined value.

4. The control valve of claim 2, further characterized by:
(A) cooperating stop elements carried by the body and valve members, one of which is movable from an inoperative position to an operative position at which the stop elements are effective to prevent movement of the valve member to said other of said first pair of working positions thereof;
(B) and control means carried by one of said members, for governing the effectiveness of said stop elements, comprising
(1) a pressure chamber, which is communicated with said second service passage in said other of said first pair of working positions of the valve member,
(2) and a pressure responsive plunger in said chamber actuatable in one direction out of a normally inactive position to effect movement of said movable stop element to its operative position in response to fluid in the chamber at a pressure in excess of a predetermined value.

5. The control valve of claim 2, further characterized by:
(A) interengageable stop elements carried by the body and valve members and relatively movable into and out of cooperative stop defining relationship in which the stop elements are effective to prevent movement of the valve member to its said other of said first pair of working positions and to the other of said second pair of working positions thereof without interfering with movement of the valve element to its remaining working positions;
(B) and control means carried by one of said members for governing the effectiveness of said stop elements, comprising
(1) a pressure chamber which is communicated with said second service passage in said other of said first pair of working positions and in said other of said second pair of working positions of the valve member,
(2) and a pressure responsive plunger in said chamber actuatable in one direction out of a normally inactive position in response to fluid in the chamber at a pressure exceeding a predetermined value, to effect relative movement of the stop elements into said stop defining relationship thereof.

6. A hydraulic control valve, comprising the combination of:
(A) a body member having
(1) inlet passage means,
(2) outlet passage means,
(3) a pair of service passages that are connectable with the opposite ends of a double acting cylinder,
(4) and a bore with which all of said passage means and passages communicate;
(B) a valve member movable in the bore out of a neutral position from one to the other of a first pair of working positions at opposite sides of its neutral position, and at which the valve member is adapted to in turn connect each of the service passages with the inlet passage means and the other service passage with the outlet means to effect operation of a double acting cylinder in opposite directions at slow speeds, said valve member being movable to a second pair of working positions at opposite sides of its neutral position and beyond its first pair of working positions, and at which the valve member is cooperable with said passages and passage means to effect operation of a double acting cylinder in opposite directions at greater speeds;

(C) and cooperating pressure responsive stop means carried by the body and valve members and activatable to prevent movement of the valve member beyond said first pair of working positions in response to excessive pressure conditions in one of said service passages.

7. A hydraulic control valve of the type comprising a body having a spool bore in which an endwise slidable valve element is shiftable between defined "hold," "slow lower" and "fast lower" positions, said body having a pair of service passages therein connectable with opposite ends of a double acting hydraulic cylinder in which a piston is movable in opposite directions, a pressure fluid supply passage connectable with a source of fluid under pressure, and a return fluid passage communicating with an outlet in the valve body, said control valve being characterized by:

(A) cooperating means on the valve element and the valve body, operative when the valve element is in its defined "hold" position, for preventing communication through the valve body between each service passage and both the pressure fluid supply and return fluid passages;

(B) cooperating means on the valve element and the valve body, operative when the valve element is in its defined "slow lower" position, for
  (1) providing substantially free communication between the pressure fluid passage and one of the service passages, so that substantially unrestricted fluid flow at substantially the full pressure provided by the fluid pressure source is available to the end of a cylinder connected with said service passage, and
  (2) providing substantially restricted communication between the other service passage and the return fluid passage so that the rate of motion of a load connected with the piston in the cylinder is controlled by the rate at which return fluid is permitted to flow from said other service passage to the return fluid passage, and
  (3) said last named cooperating means comprising a small diameter passage in the valve element, having opposite ends which open to axially spaced apart locations thereon, to provide said restricted communication between said other service passage and the return fluid passage;

(C) and cooperating means on the valve element and the valve body, operative when the valve element is in its defined "fast lower" position,
  (1) for preventing communication between each service passage and the pressure fluid passage,
  (2) and providing for communication between both service passages and the return fluid passage, to permit fluid to flow substantially unrestrictedly through the valve body from one end of the cylinder to the other and thus allow the piston in the cylinder to be moved substantially freely by a load connected therewith and exerting force thereon in one direction.

8. The hydraulic control valve of claim 7, wherein:
(A) said return fluid passage comprises
  (1) an outlet passage
  (2) a pair of exhaust passages, one for each service passage, said exhaust passages communicating with one another and with the outlet passage and serving to connect the service passages with one another in said defined "fast lower" position of the valve element;

(B) and further characterized by means restricting communication between said exhaust passages and the outlet passage so as to assure that a substantial amount of the fluid returning to the valve body from said one end of the cylinder will be available for flow to said other end of the cylinder when the valve element is in said defined "fast lower" position thereof.

9. In a hydraulic control valve of the type comprising a body member having pressure fluid supply and exhaust passage means, a pair of service passages connectable with the opposite ends of a double acting hydraulic cylinder, a bore with which the supply and exhaust passage means and the service passages communicate, and a valve member in the bore shiftable from a hold position to first and second operating positions to selectively connect either service passage with the supply passage means and the other service passage with the exhaust passage means, the valve member being also shiftable to third and fourth operating positions, and said control valve being further characterized by:

(A) means in one of said members operable in the first operating position of the valve member at which it connects a first one of the service passages with the supply passage means and the second service passage with the exhaust passage means for limiting flow of return fluid from said second service passage to the exhaust passage means;

(B) cooperating means on said members operable in the third operating position of the valve member to block off both service passages from the supply passage means and to communicate said service passages with one another and with the exhaust passage means;

(C) and cooperating means on said members operable in the fourth operating position of the valve member to block off both service passages from the exhaust passage means and to communicate both of said service passages with the supply passage means.

10. The control valve of claim 9 wherein said flow limiting means of element A thereof is incorporated in the valve member.

11. In combination:
(A) a double acting hydraulic lift cylinder having
  (1) head and rod ends,
  (2) a piston reciprocable in the cylinder and upon which pressure fluid in the head end of the cylinder exerts force in a lifting direction to move the piston toward the rod end of the cylinder,
  (3) and a piston rod having one end connected to the piston and projecting from the rod end of the cylinder;

(B) and a control valve for governing flow of pressure fluid to and from said ends of the cylinder, said control valve having a body member and comprising
  (1) supply passage means in the body member, connectable with a pressure fluid source,
  (2) exhaust passage means in the body member including an outlet passage,
  (3) first and second service passages in the body member respectively connected with the rod and head ends of the cylinder,
  (4) a bore in the body member with which the service passages and the supply and exhaust passage means communicate,
  (5) a valve member slidable back and forth in the bore from a neutral position to first, second, third and fourth operating positions,
  (6) cooperating fluid flow control means on the body and valve members operable in the neutral position of the valve member to close off the service passages from the supply passage means,
  (7) and cooperating passage defining means on the body and valve members operable in said first working position of the valve member to communicate the first service passage with the supply passage means and to afford restricted comunication between the second service passage and the exhaust passage means, to thus cause the piston to move toward the head end of the cylinder at a substantially slow rate determined by the degree to which communication between said second service passage and the exhaust passage means is restricted, (8) said cooperating passage defining means being operable in said second working position of the valve member to communicate the second service passage with the supply passage means and to communicate the first service passage with the exhaust passage means, to thus cause the piston to move in the lifting direction toward the rod end of the cylinder at one rate of travel, (9) and said cooperating passage defining means being operable in said third working position of the valve member to close off both service passages from the exhaust passage means and to communicate the supply passage means and said first service passage with the second service passage so that the latter conducts presure fluid from both the supply passage means and from the rod end of the cylinder to the head end of the cylinder to thus cause the piston to travel in the lifting direction toward the rod end of the cylinder at a rate faster than it travels in said second working position of the valve member,

(10) and said cooperating passage defining means being operable in said fourth working position of the valve member to close off both service passages from the supply passage means and to communicate the service passages with the exhaust passage means and with one another so as to allow the piston to be substantially rapidly driven toward the head end of its cylinder by a load to which the piston rod is connected.

12. The combination of claim 11, wherein said cooperating passage defining means comprises flow restricting means incorporated in the valve member and operable in said said first working position thereof to afford said restricted communication between the second service passage and the exhaust passage means.

13. The combination of claim 11:
(A) wherein said exhaust passage means comprises separate exhaust passage branches, one for each service passage;
(B) wherein both of said branches communicate with the same outlet passage in the body;
(C) and wherein restriction means in the body limits flow of return fluid to the outlet passage from the exhaust branch for the second service passage in said fourth working position of the valve member so as to assure flow of a substantial amount of such return fluid to the rod end of the cylinder via the exhaust passage branches and the first service passage.

References Cited by the Examiner

UNITED STATES PATENTS

| 1,946,503 | 2/1934 | Schafer | 91—355 |
| 2,848,014 | 8/1958 | Tennis | 137—624.27 |

EDGAR W. GEOGHEGAN, *Primary Examiner.*

SAMUEL LEVINE, *Examiner.*

P. T. COBRIN, *Assistant Examiner.*